(12) United States Patent     (10) Patent No.:   US 12,587,584 B2
Ki et al.         (45) Date of Patent:   *Mar. 24, 2026

(54) SYSTEM AND METHOD OF DISK SHARING FOR CLOUD CONTENT STORAGE

(71) Applicant: Samsung Electronics Co., Ltd., Suwon-si (KR)

(72) Inventors: Yang Seok Ki, Palo Alto, CA (US); Sungwook Ryu, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/232,300

(22) Filed: Aug. 9, 2023

(65) Prior Publication Data

US 2023/0388381 A1     Nov. 30, 2023

Related U.S. Application Data

(63) Continuation of application No. 16/987,132, filed on Aug. 6, 2020, now Pat. No. 11,765,235.

(Continued)

(51) Int. Cl.
*H04L 12/24*       (2006.01)
*A63F 13/48*       (2014.01)
(Continued)

(52) U.S. Cl.
CPC ............ *H04L 67/131* (2022.05); *A63F 13/48* (2014.09); *G06F 9/30043* (2013.01);
(Continued)

(58) Field of Classification Search
CPC . H04L 65/1076; H04L 63/101; H04L 63/102; H04L 65/1069; H04L 65/1086;
(Continued)

(56) References Cited

U.S. PATENT DOCUMENTS

| | | | |
|---|---|---|---|
| 8,615,594 B2 | 12/2013 | Liu et al. | |
| 9,396,195 B1 * | 7/2016 | Beguelin | ............ H04N 21/4788 |

(Continued)

FOREIGN PATENT DOCUMENTS

| | | |
|---|---|---|
| CN | 108427650 A | 8/2018 |
| CN | 109799951 A | 5/2019 |

(Continued)

OTHER PUBLICATIONS

AWS Cloud-based game architecture, 2017, 36 pages, URL: https://www.slideshare.net/awskorea/aws-cloud-game-architecture?from_action=save.

(Continued)

*Primary Examiner* — Ario Etienne
*Assistant Examiner* — Elizabeth Kassa
(74) *Attorney, Agent, or Firm* — Womble Bond Dickinson (US) LLP

(57)         ABSTRACT

A content provider system includes: a repository to store a catalog of content; a storage device including at least a first port and a second port; a first hosted device connected to the first port over a first storage interface for access to the storage device, and to execute content stored in the storage device to provide the content to a first user device; a second hosted device connected to the second port over a second storage interface for access to the storage device, and to execute the content stored in the storage device to provide the content to a second user device; and one or more processing circuits to control access to the storage device from the first and second ports by the first and second hosted devices.

20 Claims, 7 Drawing Sheets

Related U.S. Application Data

(60) Provisional application No. 63/050,051, filed on Jul. 9, 2020, provisional application No. 63/012,053, filed on Apr. 17, 2020, provisional application No. 63/012,050, filed on Apr. 17, 2020, provisional application No. 62/988,912, filed on Mar. 12, 2020.

(51) Int. Cl.

| | |
|---|---|
| *G06F 9/30* | (2018.01) |
| *G06F 9/54* | (2006.01) |
| *H04L 41/0803* | (2022.01) |
| *H04L 67/00* | (2022.01) |
| *H04L 67/06* | (2022.01) |
| *H04L 67/1097* | (2022.01) |
| *H04L 67/131* | (2022.01) |

(52) U.S. Cl.
CPC .............. *G06F 9/542* (2013.01); *H04L 67/06* (2013.01); *H04L 67/1097* (2013.01); *H04L 67/34* (2013.01)

(58) Field of Classification Search
CPC ............. H04L 65/1093; H04L 65/4015; H04L 63/105; G06N 20/00; G06N 3/0442; G06N 3/09
USPC .................................................. 709/204, 203
See application file for complete search history.

(56) References Cited

U.S. PATENT DOCUMENTS

| | | | | |
|---|---|---|---|---|
| 9,566,503 | B2 * | 2/2017 | Lee ....................... | H04L 67/131 |
| 9,619,389 | B1 | 4/2017 | Roug | |
| 10,394,305 | B2 | 8/2019 | Kim | |
| 10,610,779 | B2 | 4/2020 | Hunter | |
| 10,768,820 | B2 | 9/2020 | Subramanian et al. | |
| 10,817,218 | B2 | 10/2020 | Jo | |
| 11,010,054 | B1 | 5/2021 | Himelstein et al. | |
| 11,321,259 | B2 | 5/2022 | Colenbrander | |
| 11,759,707 | B2 | 9/2023 | Hunter | |
| 11,782,833 | B2 * | 10/2023 | Ki ..................... | G06F 16/24552 |
| | | | | 711/118 |
| 2006/0264239 | A1 * | 11/2006 | Tominaga ............. | G06F 16/182 |
| | | | | 707/E17.032 |
| 2009/0019248 | A1 * | 1/2009 | Jeong .................. | G06F 12/1458 |
| | | | | 711/163 |
| 2009/0117890 | A1 | 5/2009 | Jacobsen et al. | |
| 2009/0198954 | A1 * | 8/2009 | Sanders .................. | G06F 40/12 |
| | | | | 711/212 |
| 2012/0004042 | A1 | 1/2012 | Perry et al. | |
| 2013/0035165 | A1 | 2/2013 | Satake et al. | |
| 2013/0344963 | A1 * | 12/2013 | Gupta ................... | A63F 9/0611 |
| | | | | 463/40 |
| 2014/0215265 | A1 | 7/2014 | Mohanta et al. | |
| 2015/0013016 | A1 * | 1/2015 | Kanter ............... | G06F 21/6245 |
| | | | | 726/28 |
| 2015/0242877 | A1 * | 8/2015 | Bliss ...................... | H04N 21/84 |
| | | | | 705/14.66 |
| 2015/0258437 | A1 | 9/2015 | Kruglick | |
| 2015/0365489 | A1 * | 12/2015 | Ann ........................ | H04L 67/56 |
| | | | | 709/219 |
| 2016/0299767 | A1 | 10/2016 | Mukadam | |
| 2016/0335108 | A1 | 11/2016 | Ryu et al. | |
| 2017/0050110 | A1 | 2/2017 | Perry | |
| 2017/0087464 | A1 | 3/2017 | Perry et al. | |
| 2017/0169176 | A1 * | 6/2017 | Abiola ................ | H04L 63/0428 |
| 2017/0199765 | A1 | 7/2017 | Ahn et al. | |
| 2018/0095915 | A1 | 4/2018 | Prabhakar et al. | |
| 2018/0284876 | A1 | 10/2018 | Ray et al. | |
| 2018/0361235 | A1 * | 12/2018 | Hunter ................ | H04L 67/5681 |
| 2019/0102206 | A1 | 4/2019 | Fichtenholtz et al. | |
| 2019/0179805 | A1 | 6/2019 | Prahlad et al. | |
| 2019/0235777 | A1 | 8/2019 | Wang et al. | |
| 2019/0270019 | A1 * | 9/2019 | Miura ................ | H04N 21/4781 |
| 2019/0387634 | A1 | 12/2019 | Aspnes et al. | |
| 2020/0050403 | A1 * | 2/2020 | Suri ...................... | G06F 3/0664 |
| 2020/0094150 | A1 | 3/2020 | Miura et al. | |
| 2020/0104153 | A1 | 4/2020 | Shibayama et al. | |
| 2021/0042255 | A1 * | 2/2021 | Colenbrander ....... | G06F 3/0659 |
| 2021/0056603 | A1 * | 2/2021 | Vidal ...................... | A63F 13/87 |
| 2021/0056860 | A1 * | 2/2021 | Fahrendorff .......... | G06Q 10/10 |
| 2021/0245047 | A1 * | 8/2021 | Dharmapurikar ..... | A63F 13/358 |
| 2021/0295654 | A1 * | 9/2021 | Kiss .................... | G07F 17/3244 |

FOREIGN PATENT DOCUMENTS

| | | |
|---|---|---|
| CN | 109840050 A | 6/2019 |
| CN | 111338578 A | 6/2020 |
| KR | 10-2019-0056295 A | 5/2019 |
| KR | 10-2019-0060328 A | 6/2019 |
| TW | 201126356 A1 | 8/2011 |
| TW | I421692 B | 1/2014 |

OTHER PUBLICATIONS

U.S. Office Action dated Dec. 24, 2021, issued in U.S. Appl. No. 17/008,509 (10 pages).

U.S. Notice of Allowance dated Mar. 24, 2022, issued in U.S. Appl. No. 17/008,509, 11 pages.

U.S. Office Action dated Jul. 21, 2022, issued in U.S. Appl. No. 17/008,509 (11 pages).

EPO Office Action dated Jan. 27, 2023, issued in corresponding European Patent Application No. 21164175.8 (8 pages).

US Final Office Action dated Mar. 2, 2023, issued in U.S. Appl. No. 17/008,509 (13 pages).

US Notice of Allowance dated May 25, 2023, issued in U.S. Appl. No. 17/008,509 (7 pages).

Taiwanese Office Action dated Jul. 19, 2024, issued in corresponding Taiwanese Patent Application No. 110105022 (7 pages).

Korean Office Action dated Apr. 16, 2024, issued in Korean Patent Application No. 10- 2021-0007275 (6 pages).

Taiwanese Office Action dated May 1, 2024, issued in Taiwanese Patent Application No. 110107217 (4 pages).

US Office Action dated Aug. 1, 2024, issued in U.S. Appl. No. 18/241,767 (15 pages).

US Final Office Action dated Feb. 24, 2025, issued in U.S. Appl. No. 18/241,767 (14 pages).

US Office Action dated Jun. 4, 2025, issued in U.S. Appl. No. 18/241,767 (18 pages).

Chinese Office Action dated May 30, 2025, issued in Chinese Patent Application No. 202110178491.9, 10 pages.

Korean Office Action corresponding to KR Application No. 10-2020-0177223, dated Jul. 17, 2025 (7 pages).

Chinese Notice of Allowance corresponding to CN Application No. 202110178491.9, dated Aug. 28, 2025 (7 pages).

US Notice of Allowance dated Sep. 12, 2025, issued in U.S. Appl. No. 18/241,767 (10 pages).

* cited by examiner

SYSTEM AND METHOD OF DISK SHARING FOR CLOUD CONTENT STORAGE

CROSS-REFERENCE TO RELATED APPLICATION(S)

This application is a continuation of U.S. patent application Ser. No. 16/987,132, filed on Aug. 6, 2020, which claims priority to and the benefit of U.S. Provisional Application No. 63/050,051, filed on Jul. 9, 2020, entitled "LOCAL DISK SHARING FOR CLOUD GAME STORAGE," Provisional Patent Application No. 63/012,050, filed on Apr. 17, 2020, Provisional Patent Application No. 63/012,053, filed on Apr. 17, 2020, and Provisional Patent Application No. 62/988,912, filed on Mar. 12, 2020, the entire content of all of which is incorporated by reference herein.

FIELD

Aspects of one or more example embodiments of the present disclosure relate to local disk sharing, and more particularly, to a system and method of local disk sharing for cloud content storage.

BACKGROUND

As information technology society evolves, an increased amount of data is being stored and served remotely, for example, from data centers, cloud storage systems, and/or the like. For example, data centers, cloud storage systems, and/or the like may generally include a network of compute resources and storage resources. The compute resources may process data stored in the storage resources to provide the processed data to a user. However, due to data processing constraints, efficient use of the storage resources may be limited.

The above information disclosed in this Background section is for enhancement of understanding of the background of the present disclosure, and therefore, it may contain information that does not constitute prior art.

SUMMARY

One or more example embodiments of the present disclosure are directed to a cloud gaming storage system, and a method for local disk sharing thereof.

According to one or more example embodiments of the present disclosure a content provider system includes: a repository configured to store a catalog of content; a storage device including at least a first port and a second port; a first hosted device connected to the first port over a first storage interface for access to the storage device, and configured to execute content stored in the storage device to provide the content to a first user device; a second hosted device connected to the second port over a second storage interface for access to the storage device, and configured to execute the content stored in the storage device to provide the content to a second user device; and one or more processing circuits configured to control access to the storage device from the first and second ports by the first and second hosted devices.

In an embodiment, the first storage interface may correspond to a first Peripheral Component Interconnect Express (PCIe) lane, and the second storage interface may correspond to a second PCIe lane.

In an embodiment, the storage device may include: a first private namespace associated with the first port, and including user data and operating system information corresponding to the first hosted device; a second private namespace associated with the second port, and including user data and operating system information corresponding to the second hosted device; and one or more shared namespaces associated with one or more of the content stored in the storage device, and including partition information and a logical unit number (LUN) corresponding to the one or more of the content stored in the storage device.

In an embodiment, the one or more processing circuits may be configured to: receive a request for a requested content from at least one of the first and second devices; identify an available one of the shared namespaces for storing the requested content; and load the requested content from the repository to the available one of the shared namespaces.

In an embodiment, the one or more processing circuits may be configured to: identify an inactive one of the shared namespaces as the available one of the shared namespaces; and resize the inactive one of the shared namespaces according to a size of the requested content to store the requested content.

In an embodiment, the one or more processing circuits may be configured to: identify an inactive one of the shared namespaces as the available one of the shared namespaces; and remove content currently associated with the inactive one of the shared namespaces to store the requested content.

In an embodiment, in response to the loading of the requested content from the repository to the available one of the shared namespaces, the one or more processing circuits may be configured to: associate the available one of the shared namespaces to at least one of the first and second private namespaces.

In an embodiment, in response to associating the available one of the shared namespaces to at least one of the first and second private namespaces, the one or more processing circuits may be configured to: provide the first or second private namespaces to a local file system of at least one of the first or second hosted devices.

In an embodiment, the requested content may correspond to a first request by the first hosted device and a second request by the second hosted device, and the one or more processing circuits may be configured to: load the requested content from the repository to the storage device in response to the first request; and register the second request for a notification corresponding to a load completion of the first request.

According to one or more example embodiments of the present disclosure, a method for local disk sharing in a content provider system including a storage device including at least first and second ports; a first hosted device connected to the first port over a storage interface to execute content stored in the storage device; and a second hosted device connected to the second port over the storage interface to execute the content stored in the storage device, includes: receiving, by one or more processors, a request for a requested content from at least one of the first or second hosted devices over at least one of the first or second ports; and controlling, by the one or more processors, loading of the requested content from the repository to the storage device.

In an embodiment, the storage interface may include at least a first Peripheral Component Interconnect Express (PCIe) lane corresponding to the first port, and a second PCIe lane corresponding to the second port.

In an embodiment, the storage device may include: a first private namespace associated with the first port, and including user data and operating system information corresponding to the first hosted device; a second private namespace associated with the second port, and including user data and operating system information corresponding to the second hosted device; and one or more shared namespaces associated with one or more of the content stored in the storage device, and including partition information and a logical unit number (LUN) corresponding to the one or more of the content stored in the storage device.

In an embodiment, the method may further include: identifying, by the one or more processing circuits, an available one of the shared namespaces for storing the requested content; and loading, by the one or more processing circuits, the requested content from the repository to the available one of the shared namespaces.

In an embodiment, the method may further include: identifying, by the one or more processing circuits, an inactive one of the shared namespaces as the available one of the shared namespaces; and resizing, by the one or more processing circuits, the inactive one of the shared namespaces according to a size of the requested content to store the requested content.

In an embodiment, the method may further include: identifying, by the one or more processing circuits, an inactive one of the shared namespaces as the available one of the shared namespaces; and removing, by the one or more processing circuits, content associated with the inactive one of the shared namespaces to store the requested content.

In an embodiment, in response to the loading of the requested content from the repository to the available one of the shared namespaces, the method may further include: associating, by the one or more processing circuits, the available one of the shared namespaces to at least one of the first and second private namespaces.

In an embodiment, in response to associating the available one of the shared namespaces to at least one of the first and second private namespaces, the method may further include: providing, by the one or more processors, the first or second private namespaces to a local file system of at least one of the first or second hosted devices.

In an embodiment, the requested content may correspond to a first request by the first hosted device and a second request by the second hosted device, and the method may further include: loading, by the one or more processing circuits, the requested content from the repository to the storage device in response to the first request; and registering, by the one or more processing circuits, the second request for a notification corresponding to a load completion of the first request.

According to one or more example embodiments of the present disclosure, a system includes: a storage device including a first port, a second port, a first private namespace associated with the first port, a second private namespace associated with the second port, and one or more shared namespaces associated with content stored on the storage device; a first hosted device connected to the first port over a first Peripheral Component Interconnect Express (PCIe) lane for access to the storage device, and configured to execute the content stored on the storage device to stream the content to a first user device; a second hosted device connected to the second port over a second PCIe lane for access to the storage device, and configured to execute the content stored on the storage device to stream the content to a second user device; and one or more processing circuits configured to: receive a request for a requested content from at least one of the first and second devices; identify an available namespace from among the shared namespaces for storing the requested content; and load the requested content from a repository of a catalog of content to the available one of the shared namespaces.

In an embodiment, in response to loading of the requested game from the repository to the available one of the shared namespaces, the one or more processing circuits may be further configured to: associate the available one of the shared namespaces to at least one of the first and second private namespaces; and provide the first or second private namespaces to a local file system of at least one of the first or second hosted devices.

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Figure 1:
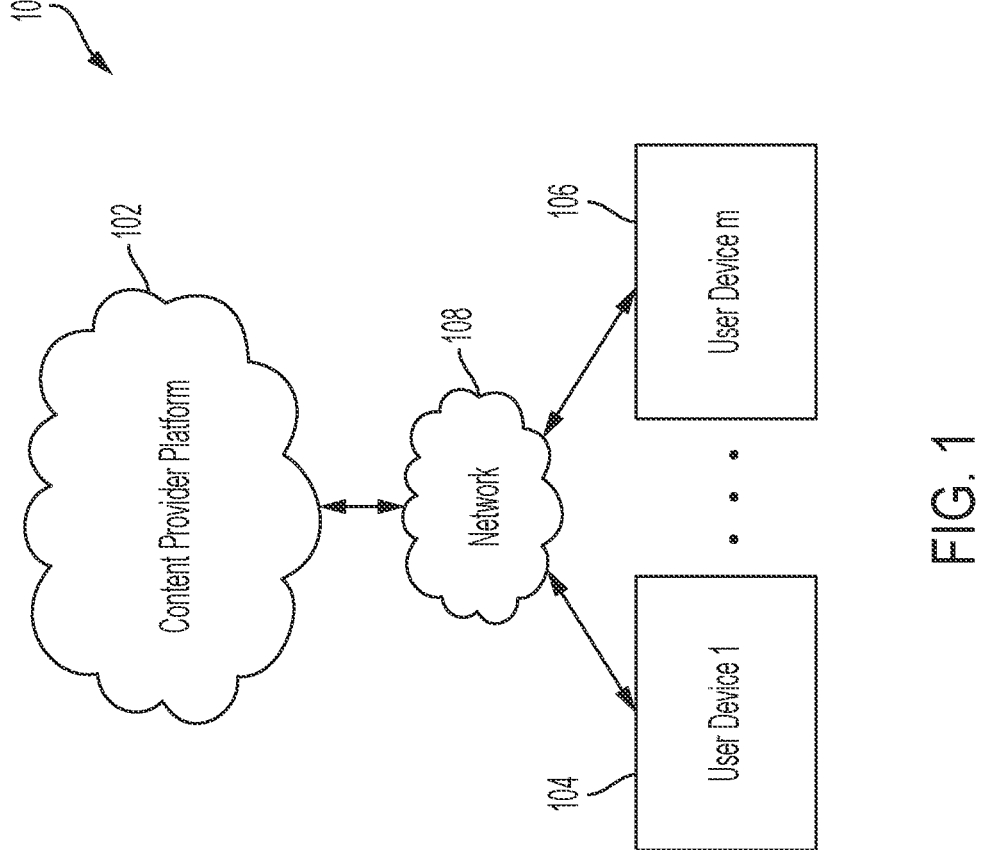
FIG. 1 illustrates a block diagram of a content provider system, according to one or more example embodiments of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

Generally, cloud gaming services for console-based gaming platforms enable users of such console-based gaming platforms to remotely run and play games that are stored in the cloud. For example, these cloud gaming services may host multiple physical console devices in a rack server, such that each of the hosted devices loads, executes, and streams a game directly to a user's personal device. In other words, each of the physical console devices hosted by the rack server may load a game stored in the cloud, may locally execute the game, and may stream the game directly to a user's personal device to enable the user to play the game remotely without having to directly download the game (e.g., an entirety of the game or a portion of the game) on the user's personal device.

For example, each rack server may host a plurality of physical console devices, and each of the hosted devices may have its own local processor, local disk storage, and/or the like to enable the user to remotely load, access, and play games on a particular one of the hosted devices from the user's personal device. In this case, however, the local processor of a hosted device may become saturated, such that the local disk storage of the hosted device may be underutilized.

For example, each hosted device of a cloud gaming service for a console-based gaming platform may correspond to a physical console device of the console-based gaming platform, such that each of the hosted devices may have a local processor, for example, such as a central processing unit (e.g., a CPU), a graphics processing unit (e.g., a GPU), or an application processing unit (e.g., an APU), which may correspond to a combination of a CPU/ GPU, and a local storage device, for example, such as a Solid State Drive (SSD). In this case, however, the local processor of each hosted device may become saturated, for example, during game play, such that the local storage device of each hosted device may be underutilized, even when the local storage device has bandwidth and/or capacity, for example, to serve other users. Accordingly, while adding additional hosted devices may enable scaling of the local processors of the cloud gaming service, for example, by adding additional local processors thereto, the local storage devices of the additional hosted devices may still be underutilized, as utilization of the additional local storage devices may be limited by saturation of the local processors thereof.

According to one or more example embodiments of the present disclosure, rather than having a local storage device for each of the hosted devices, a local storage device may be shared by a plurality of hosted devices, for example, such that each local storage device may be utilized by a plurality of hosted devices concurrently (e.g., simultaneously or at the same time). For example, each local storage device may include a plurality of ports (e.g., a plurality of channels), and each port may be dedicated to a corresponding one of the plurality of hosted devices. In this case, one of the plurality of hosted devices may write to the local storage device via its dedicated port (e.g., its dedicated channel) at a time, for example, when loading a game into the local storage device, and each of the plurality of hosted devices may read from the local storage device via its dedicated port (e.g., its dedicated channel) concurrently (e.g., simultaneously or at the same time), for example, when executing a game currently stored in the local storage device. Accordingly, utilization of the local storage device may be improved, and system costs may be reduced.

FIG. 1 illustrates a block diagram of a content provider system, according to one or more example embodiments of the present disclosure.

Referring to FIG. 1, a content provider system 100 may include a content provider platform 102 and one or more user devices 104 to 106. The one or more user devices 104 to 106 may access the content provider platform 102 over a communication network (e.g., wide area network (WAN), a local area network (LAN), the Internet, a cellular network, and/or the like) 108 to access content served by the content provider platform 102. For example, in some embodiments, the content provider platform 102 may provide video content, game content, and/or the like, which may be streamed by the one or more user devices 104 to 106 over the communication network 108. Hereinafter, for convenience, the content provider system 100 may be described in the context of a cloud gaming service for a console-based gaming platform such that the content provider platform corresponds to a cloud gaming provider platform, but the present disclosure is not limited thereto, and in various embodiments, the content provider system 100 may provide any suitable kinds of content to a user device, for example, such as video streaming content, audio streaming content, data searching content, and/or the like.

Each of the one or more user devices 104 to 106 may correspond to a suitable computing device to enable a user of the user device (e.g., 104 or 106) to receive (e.g., to stream) content (e.g., game content) from the content provider platform 102, and to provide control signals to the content provider platform 102 to control the content (e.g., to control in-game content). For example, in some embodiments, each of the one or more user devices 104 to 106 may include a console device corresponding to a console-based gaming platform associated with the content provider platform 102, but the present disclosure is not limited thereto. For example, each of the user devices 104 to 106 may include any suitable computing device having at least a thin-shell application or an emulator application installed thereon to receive and control the content served by the content provider platform 102, for example, such as a mobile phone, a smart phone, a tablet, a personal computer PC, a laptop computer, a smart wearable device, and/or the like. In other examples, each of the user devices 104 to 106 may include a smart television, a media streaming device, a media streaming dongle, and/or the like to enable the user to stream media served by the content provider platform 102. In some embodiments, each of the user devices 104 to 106 may communicate with the content provider platform 102 over the communication network 108 to enable a user thereof to remotely select, load, and/or execute (e.g., run) a game stored at the content provider platform 102.

Figure 2:
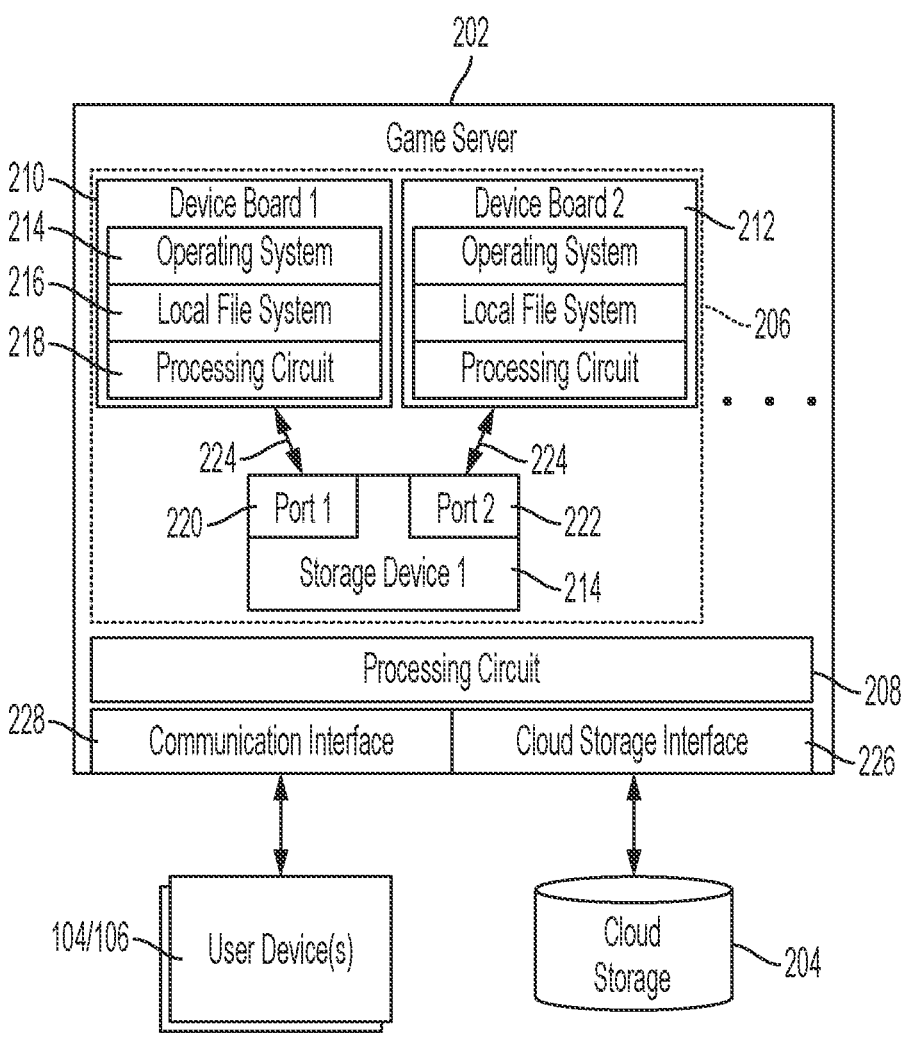
FIG. 2 illustrates a block diagram of a content provider platform, according to one or more example embodiments of the present disclosure.

FIG. 2 illustrates a block diagram of a content provider platform, according to one or more example embodiments of the present disclosure.

Referring to FIG. 2, in one or more example embodiments of the present disclosure, the content provider platform 102 may include a game server 202 and cloud storage 204. The game server 202 may include one or more rack servers 206, and one or more processing circuits 208. Each of the one or more rack servers 206 may include a plurality of device boards 210 and 212, and a local storage device 214. Each of the device boards 210 and 212 may correspond to a device board of a console device, such that each of the device boards 210 and 212 may execute (e.g., may run) a game of the console device. For example, each of the device boards 210 and 212 may include an operating system 214 of the console device, a local file system 216, and one or more processing circuits (e.g., a CPU, a GPU, an APU, and/or the like) 218.

In one or more example embodiments of the present disclosure, each of the device boards 210 and 212 of the rack server 206 may share the same local storage device 214. For example, each of the device boards 210 and 212 of the rack server 206 may be connected to the local storage device 214 via a dedicated port (e.g., a dedicated channel) 220 and 222 to write to and/or to read from the local storage device 214. In a non-limiting example, as shown in FIG. 2, the local storage device 214 may be a dual-port storage device, and thus, may include a first port 220 and a second port 222. In this case, the rack server 206 may include two device boards 210 and 212, a first device board 210 connected to the local storage device 214 via the first port 220, and a second device board 212 connected to the local storage device 214 via the second port 222. While FIG. 2 shows that the local storage device 214 is a dual-port storage device, and thus, the rack server 206 includes two device boards 210 and 212 corresponding to the number of ports of the local storage device 214, the present disclosure is not limited thereto, and the local storage device 214 may include any suitable number of available ports (e.g., available access channels) such that the rack server 206 may include any suitable number of device boards corresponding to the number of available ports of the local storage device 214.

In some embodiments, the local storage device 214 may be considered as secondary memory that may persistently store data (e.g., game data) accessible by each of the device boards 210 and 212 of a corresponding rack server 206. For example, in some embodiments, the local storage device 214 may be any suitable persistent storage device, for example, such as an SSD. However, the present disclosure is not limited thereto, and in other embodiments, the local storage device 214 may include (or may be) any suitable storage device, for example, such as non-volatile memory (e.g., PCM (Phase Change Memory), RRAM or ReRAM (Resistive Random-Access Memory), and the like), a magnetic storage device (e.g., a hard disk drive (HDD), and the like), other kinds of flash memory devices (e.g., a USB flash drive, and the like), and/or the like.

In various embodiments, the local storage device 214 may conform to a large form factor standard (e.g., a 3.5 inch hard drive form-factor), a small form factor standard (e.g., a 2.5 inch hard drive form-factor), an M.2 form factor, an E1.S form factor, and/or the like. In other embodiments, the local storage device 214 may conform to any suitable or desired derivative of these form factors. For convenience, the local storage device 214 may be described hereinafter in the context of an SSD, but the present disclosure is not limited thereto.

The local storage device 214 may be communicably connected to the device boards 210 and 212 over a storage interface 224. The storage interface 224 may facilitate communications (e.g., using a connector and a protocol) between the device boards 210 and 212 and the local storage device 214. In some embodiments, the storage interface 224 may facilitate the exchange of storage requests and responses between the device boards 210 and 212 and the local storage device 214. In some embodiments, the storage interface 224 may facilitate data transfers by the local storage device 214 to and from the device boards 210 and 212.

For example, in an embodiment, the storage interface 224 (e.g., the connector and the protocol thereof) may include (or may conform to) Peripheral Component Interconnect Express (PCIe), and/or the like. However, the present disclosure is not limited thereto, and in other embodiments, the storage interface 224 (e.g., the connector and protocol thereof) may conform to other suitable storage interfaces, for example, such as Small Computer System Interface (SCSI), Serial Attached SCSI (SAS), remote direct memory access (RDMA) over Ethernet, Serial Advanced Technology Attachment (SATA), Fiber Channel, Non Volatile Memory Express (NVMe), NVMe over Fabric (NVMe-oF), and/or the like. In other embodiments, the storage interface 224 (e.g., the connector and the protocol thereof) may include (or may conform to) various general-purpose interfaces, for example, such as Ethernet, Universal Serial Bus (USB), and/or the like. For convenience, the storage interface 224 may be described hereinafter in the context of a PCIe interface, but the present disclosure is not limited thereto.

The cloud storage 204 may be communicably connected to the game server 202 via a cloud storage interface 226, and may correspond to a repository of the content provider platform 102 to store a catalog of content (e.g., a catalog of game content) served by the game server 202. For example, the cloud storage 204 may store a copy of each game in the catalog of content, such that each of the games stored on the cloud storage 204 may be read from (e.g., retrieved from) the cloud storage 204 and written to (e.g., loaded in) the local storage device 214 as needed or desired. In one or more example embodiments of the present disclosure, the cloud storage 204 may be implemented as external storage of the game server 202, but the present disclosure is not limited thereto, and the cloud storage 204 may be implemented within the game server 202 as internal storage thereof. For example, in various embodiments, the cloud storage 204 may be distributed across multiple servers or computers (e.g., that can exist in distributed locations), or may be implemented within a single computer (e.g., one server, one housing, and/or the like).

While the content provider platform 102 is shown in FIG. 2 as including the cloud storage 204 as the repository of content, the present disclosure is not limited thereto, and the content provider platform 102 may include any suitable pool of storage resources for storing content served by the content provider platform 102. For example, in various embodiments, the content provider platform 102 may include any suitable external or internal storage resource as the repository, for example, such as a data center, an edge data center, a fifth generation cellular wireless (5G) communications enabled edge data center, and/or the like for storing various kinds of content (e.g., games, video, audio, data, and/or the like) served by the content provider platform 102.

The processing circuit 218 of each of the device boards 210 and 212 may control various operations of the corresponding device board 210 and 212 thereof. For example the processing circuit 218 of each of the device boards 210 and 212 may issue commands to and may retrieve data from the local storage device 214. The processing circuit 218 of each of the device boards 210 and 212 may execute (e.g., may run) game content stored in the local storage device 214, and may receive control signals from a corresponding user device (e.g., 104 or 106) to control the game content (e.g., to control in-game content).

The processing circuit 208 of the game server 202 may control various operations of the game server 202. For example, the processing circuit 208 may facilitate communications over a communication interface 228 between a user device (e.g., 104 or 106) and a corresponding one of the device boards 210 and 212 that is assigned to serve the game content to the user device. The processing circuit 208 may communicate with the processing circuit 218 of a corresponding device board 210 or 212 to stream game content executing on the corresponding device board 210 or 212 to the user device, and to provide control signals from the user device to the corresponding device board 210 or 212 to control the game content.

In some embodiments, the game server 202 may include the cloud storage interface 226 and the communication interface 228. The cloud storage interface 226 may facilitate communications between the cloud storage 205 and the game server 202. The communication interface 228 may facilitate communications between the one or more user devices 104 and 106 and the game server 202 (e.g., via the communication network 108). Each of the interfaces 226 and 228 may be or may include wired or wireless commu-
nications interfaces (e.g., jacks, antennas, transmitters,
receivers, transceivers, wire terminals, and/or the like) for
conducting data communications with the user devices 104
and 106 or the cloud storage 204. In various embodiments,
communications via interfaces 226 and 228 may be direct
(e.g., via local wired or wireless communications) or via a
communications network 108 (e.g., the WAN, the LAN, the
Internet, the cellular network, and/or the like). For example,
interfaces 226 and 228 may include an Ethernet card and
port for sending and receiving data via an Ethernet-based
communications link or network. In another example, inter-
faces 226 and 228 may include a Wi-Fi transceiver for
communicating via a wireless communications network. In
another example, one or both of interfaces 226 and 228 may
include cellular or mobile phone communications transceiv-
ers.

According to one or more example embodiments of the
present disclosure, as will be described in more detail with
reference to FIG. 3, the game server 202 may further include
a data manager 302. The data manager 302 may insure
access control and concurrency control between the device
boards 210 and 212 and the local storage device 214. For
example, the ports of a multi-port storage device may
generally be used for redundancy purposes, such as in case
of a failover when one of the ports fails. In this case, if the
storage device receives a write request from two or more
ports concurrently (e.g., at the same or substantially the
same time), the storage device may not be able to guarantee
how that data is going to be written.

Accordingly, in one or more example embodiments of the
present disclosure, the game server 202 may include the data
manager 302 (e.g., see FIG. 3) to control access between the
device boards 210 and 212 and the shared local storage
device 214. For example, in some embodiments, at least one
of the processing circuit 218 of the first device board 210,
the processing circuit 218 of the second device board 212,
the processing circuit 208 of the game server 202, and/or a
processing circuit (e.g., a storage controller or a storage
processor) of the local storage device 214 may include the
data manager 302 (or a suitable portion thereof). In some
embodiments, the data manager 302 may be distributed such
that each of the rack servers 206 or each of the device boards
210 and 212 includes the data manager 302, and thus,
implementation of the data manager 302 may be simplified.
For example, by distributing the data manager 302 to each
of the rack servers 206 or to each of the device boards 210
and 212, the data manager 302 may only need to control
access to a corresponding local storage device 214 of the
rack server 206. However, the present disclosure is not
limited thereto, and in other embodiments, the data manager
302 may be centralized, for example, to control access to a
plurality of local storage devices 214 of a plurality of rack
servers 206.

Figure 3:
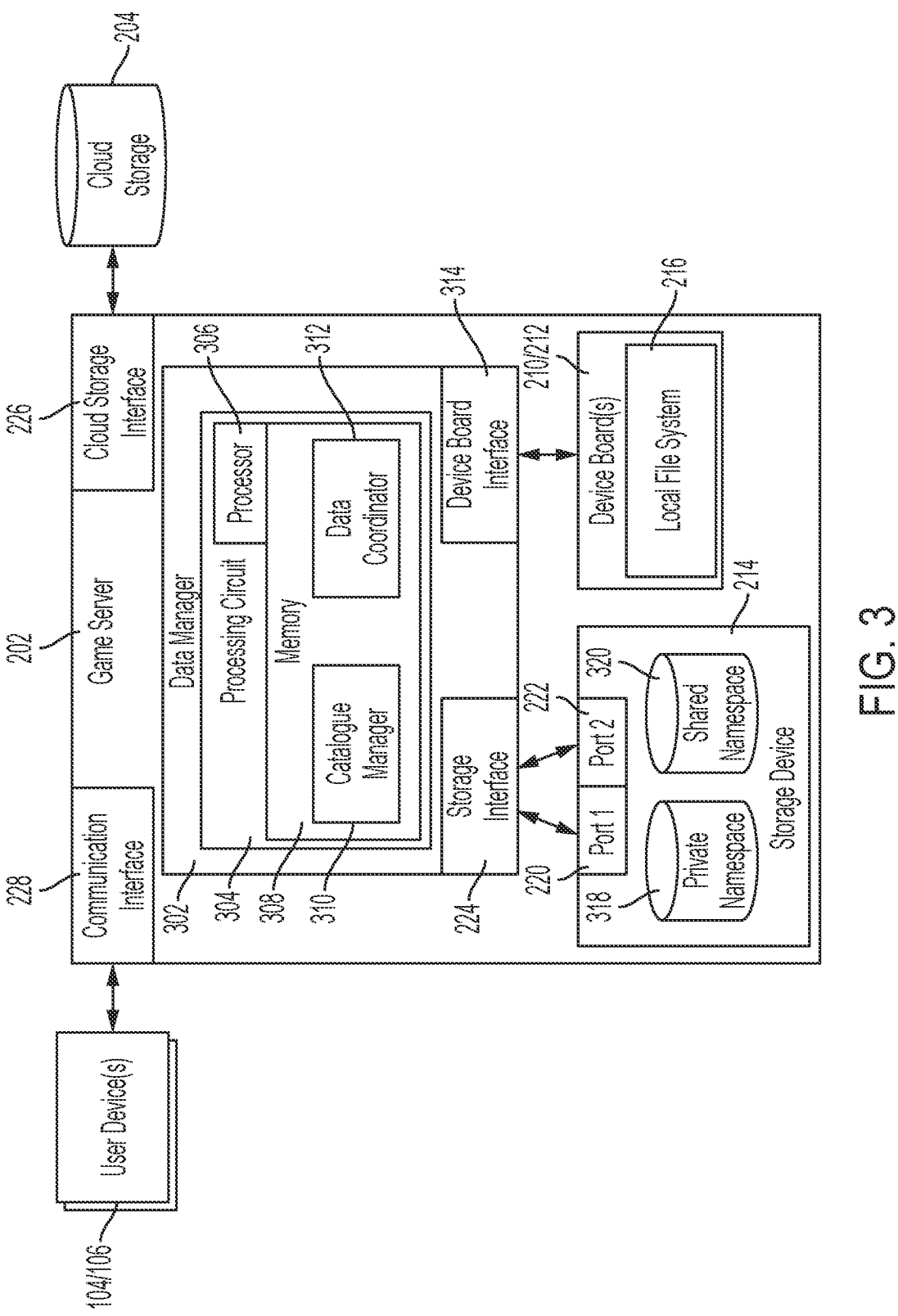
FIG. 3 illustrates a block diagram of a data storage manager of the game server shown in FIG. 2, according to one or more example embodiments of the present disclosure.
Figure 4:
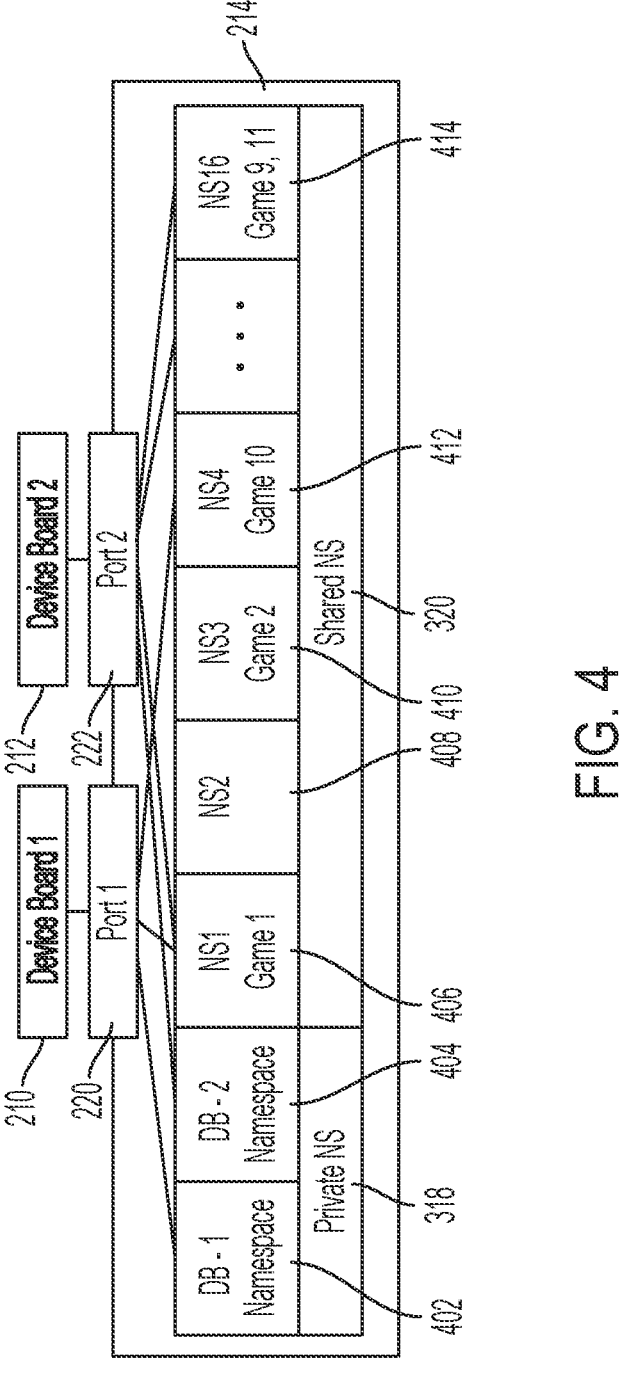
FIG. 4 illustrates a block diagram of a storage device configuration, according to one or more example embodiments of the present disclosure.

FIG. 3 illustrates a block diagram of a data storage
manager of the game server shown in FIG. 2, according to
one or more example embodiments of the present disclosure.
FIG. 4 illustrates a block diagram of a storage device
configuration, according to one or more example embodi-
ments of the present disclosure.

In one or more example embodiments of the present
disclosure, the game server 202 may further include the data
manager 302. In brief overview, the data manager 302 may
control access to and from the local storage device 214 by
the corresponding device boards 104 and 106. In some
embodiments, the data manager 302 may track a load
request of a game from a user, and may determine whether the game is already loaded on the local storage device 214
or should be loaded to the local storage device from the
cloud storage 204. In some embodiments, the data manager
302 may determine whether a game may be loaded on the
local storage device 214 from the cloud storage 204, as well
as a space (e.g., an available logical block addressing
(LBA)) of the local storage device 214 that it can use to load
the game. In some embodiments, the data manager 302 may
track updates to the local storage device 214 by any one of
the first and second device boards 212 to insure that the local
file system 216 of each of the first and second device boards
210 and 212 are synchronized with each other, for example,
when a new game is loaded into the local storage device 214.

In more detail, referring to FIG. 3, in some embodiments,
the data manager 302 may include a processing circuit 304
including a processor 306 and memory 308. For example, in
an embodiment, the processing circuit 304 may correspond
to the processing circuit 218 of each of the first and second
device boards 210 and 212, but the present disclosure is not
limited thereto. The processing circuit 304 may be commu-
nicably connected to the storage interface 224 to facilitate
communications with the local storage device 214, and may
be communicably connected to a device board interface 314
to facilitate communications with each of the device boards
210 and 212 (e.g., to facilitate communications between the
data managers 302 of each of the device boards 210 and
212). The processor 306 may be implemented as a general
purpose processor, an application specific integrated circuit
(ASIC), one or more field programmable gate arrays (FP-
GAs), a group of processing components, or other suitable
electronic processing components.

The memory 308 may include one or more devices (e.g.,
RAM, ROM, Flash memory, hard disk storage, SCM (Stor-
age Class Memory), and/or the like) for storing data and/or
computer code for completing or facilitating the various
processes described in the present application. Memory 308
may be or may include volatile memory or non-volatile
memory. Memory 308 may include database components,
object code components, script components, or any other
type of information structure for supporting the various
activities and information structures described in the present
application. According to an example embodiment, memory
308 is communicably connected to the processor 306 via the
processing circuit 304, and includes computer code for
executing (e.g., by the processing circuit 304 and/or the
processor 306) one or more processes described herein.

According to one or more example embodiments of the
present disclosure, the memory 308 may include a catalogue
manager 310 and a data coordinator 312. Each of the
catalogue manager 310 and the data coordinator 312 may be
implemented in software and/or firmware, for example, as
instructions stored in the memory 308 and executed by the
processor 306 (or the processing circuit 304).

The catalog manager 310 may control access to and from
the local storage device 214 from the first and second device
boards 210 and 212. The catalog manager 310 may deter-
mine a location of a requested game, and whether the
requested game is currently stored on the local storage
device 214 or may need to be loaded on the local storage
device 214 from a repository (e.g., from the cloud storage
204). For example, in some embodiments, the catalog man-
ager 310 may insure that only a single copy of a particular
game is stored in the local storage device 214, for example,
to improve capacity of the local storage device 214, and
thus, may determine whether the local storage device 214
already has the particular game stored thereon (e.g., cached
thereon) or if the particular game needs to be loaded to the local storage device 214 from the cloud storage 204. However, the present disclosure is not limited thereto, and in other embodiments, the local storage device 214 may store multiple copies of a particular game depending on user requirements, an application, a number of device boards connected to the local storage device 214, a storage capacity, and/or the like. In some embodiments, the catalog manager 310 may track loading status of a requested game in the local storage device 214, and may determine the owner of the loading request by exchanging control messages, even in case of concurrent loading requests.

For example, as shown in FIGS. 3 and 4, in some embodiments, the local storage device 214 may be partitioned into a private namespace 318 and a shared namespace 320. The private namespace 318 may include a plurality of dedicated namespaces 402 and 404, each of the dedicated namespaces 402 and 404 corresponding to a port of the local storage device 214, such that each of the dedicated namespaces 402 and 404 correspond to one of the first and second devices 210 and 212 connected to the first and second ports 220 and 222 of the local storage device 214. For a non-limiting example, when the first port 220 of the local storage device 214 is dedicated to the first device board 210, a first dedicated namespace 402 may correspond to the first device board 210, and when the second port 222 of the local storage device 214 is dedicated to the second device board 212, a second dedicated namespace 404 may correspond to the second device board 212. For example, in some embodiments, each of the dedicated namespaces 402 and 404 may include OS information of a corresponding one of the first and second device boards 210 and 212, user game data (e.g., user profile data, saved game data, and/or the like) currently saved on the corresponding device board 210 or 212, a game (e.g., one game and shared namespace per user) currently loaded or requested to be loaded (e.g., attached or streaming) on the corresponding device board 210 or 212 per user (e.g., up to 8 users), and/or the like.

The shared namespace 320 may include a plurality of shared namespaces 406 to 414, each of the shared namespaces 406 to 414 corresponding to one or more games currently stored on the local storage device 214. In some embodiments, the shared namespaces 406 to 414 may have static sizes, in which case each of the shared namespaces 406 to 414 may store only one game (e.g., depending on a size of the game). In other embodiments, the shared namespaces 406 to 414 may be resized as needed or desired (e.g., according to a resize command from the data coordinator 312 or the catalog manager 310), such that each of the shared namespaces 406 to 414 may store one or more games (e.g., depending on the size of the games and a size of the shared namespace). In some embodiments, each of the shared namespaces 406 to 414 may enable concurrent reading of a game therefrom, but may allow only one loading request at a time of a game thereon. While FIG. 4 illustrates 16 shared namespaces 406-414, the present disclosure is not limited thereto, and the local storage device 214 may have any suitable number of shared namespaces depending on resources thereof (e.g., a capacity, a resize function, and/or the like).

The catalog manager 310 may use (e.g., may access) each of the private namespace 318 and the shared namespace 320 to determine various states of a game stored on or being loaded on the local storage device 214. For example, the catalog manager 310 may use the private namespace 318 to determine whether a user associated with one of the device boards has received or is currently executing the game. The catalog manager 310 may use the shared namespace 320 to determine whether a requested game is currently stored on the local storage device 214. The catalog manager 310 may monitor for updates to the private namespace 318 and/or the shared namespace 320 (e.g., by the data coordinator 312) to determine whether the game has been loaded and/or provided to the device board to execute the game.

The data coordinator 312 may configure the local storage device 214, and may control writing (e.g., loading) to and reading from the local storage device 214. For example, when the catalog manager 310 determines that a requested game should be loaded onto the local storage device 214, the data coordinator 312 may read the requested game (e.g., the requested game title) from the cloud storage 204, and may load (e.g., may write) the requested game to a suitable space (e.g., one of the shared namespaces 320) of the local storage device 214. In some embodiments, the data coordinator 312 may update a catalogue state (e.g., may update the shared namespace), and may attach (e.g., via the private namespace) a location (e.g., the shared namespace) of the requested game to the device board that requested loading of the game.

In some embodiments, when the data coordinator loads a game from the cloud storage 204 into the local storage device 214, the data coordinator 312 may configure an available one of the shared namespaces 406-414 for storing the game. For example, once the loading is complete, the data coordinator 312 may update the available shared namespace with a partition and a logical unit number (LUN) associated with the loaded game. The data coordinator may then attach the shared namespace (e.g., the partition and LUN) to a corresponding one of the device boards 210 or 212. For example, the data coordinator 312 may update the dedicated namespace for the corresponding device board with the shared namespace (e.g., the partition and LUN) corresponding to the loaded game.

In some embodiments, the data coordinator 312 may mount the game (e.g., the shared namespace) to a directory (e.g., a local file system 216), such that the user may run (e.g., may execute) the game via a corresponding one of the device boards 210 or 212. For example, in some embodiments, the data coordinator may communicate with the local file system 216 of each of the device boards 210 and 212 to insure that the local file system 216 of each of the device boards 210 and 212 has the latest updates (e.g., the updates to the private and/or shared namespaces) of the local storage device 214. Accordingly, in some embodiments, rather than using a distributed file system, for example, such as a digital file system, and/or the like, which may increase latency, complexity, and costs, the data coordinator 312 may remount the namespaces (e.g., the private and shared namespaces) to the local file system 216 of each of the first and second device boards 210 and 212 as needed or desired (e.g., when there is an update to any of the private and/or shared namespaces).

Figure 5A:
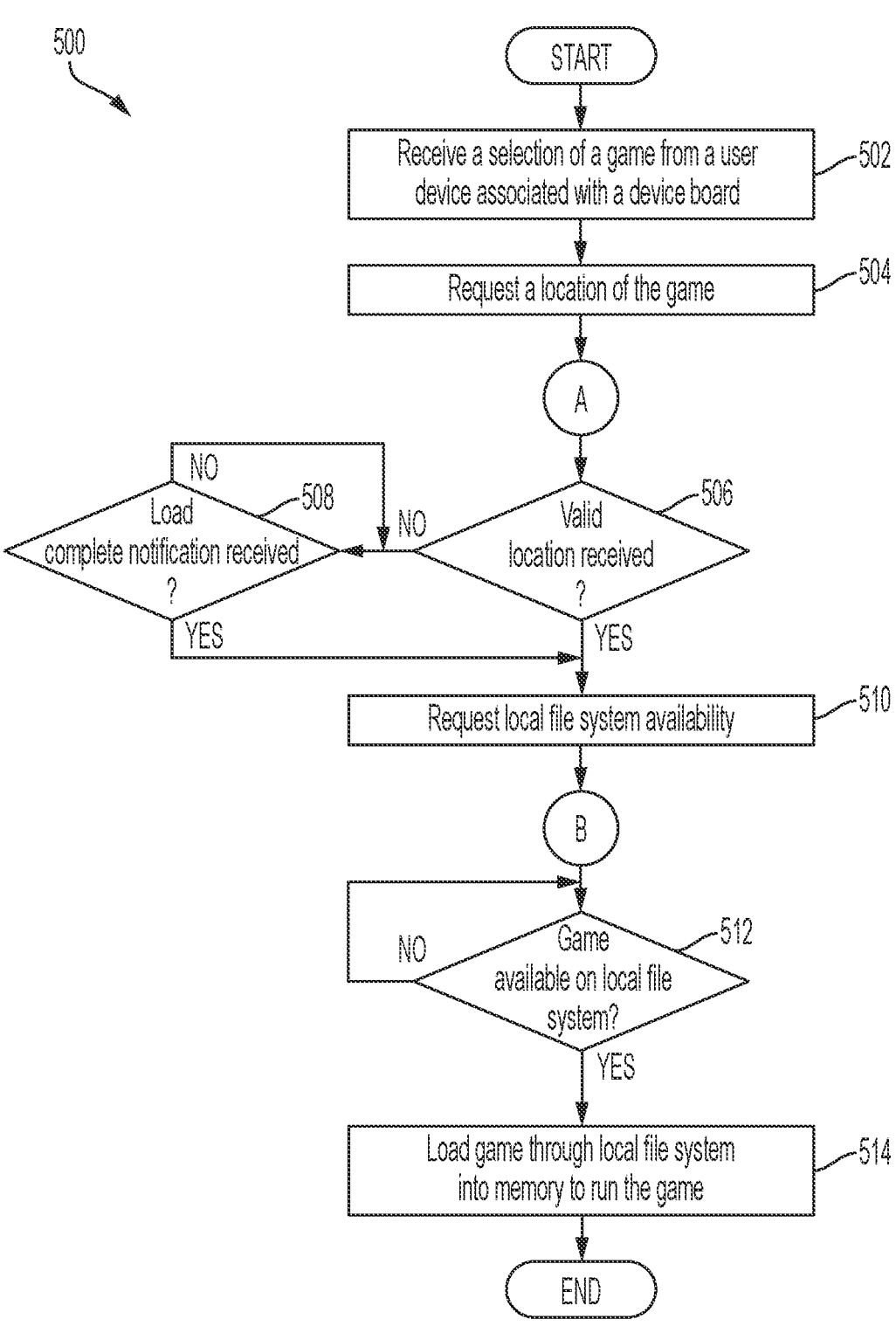
FIGS. 5A-5C are flow diagrams of a method for local disk storage sharing, according to one or more example embodiments of the present disclosure.
Figure 5B:
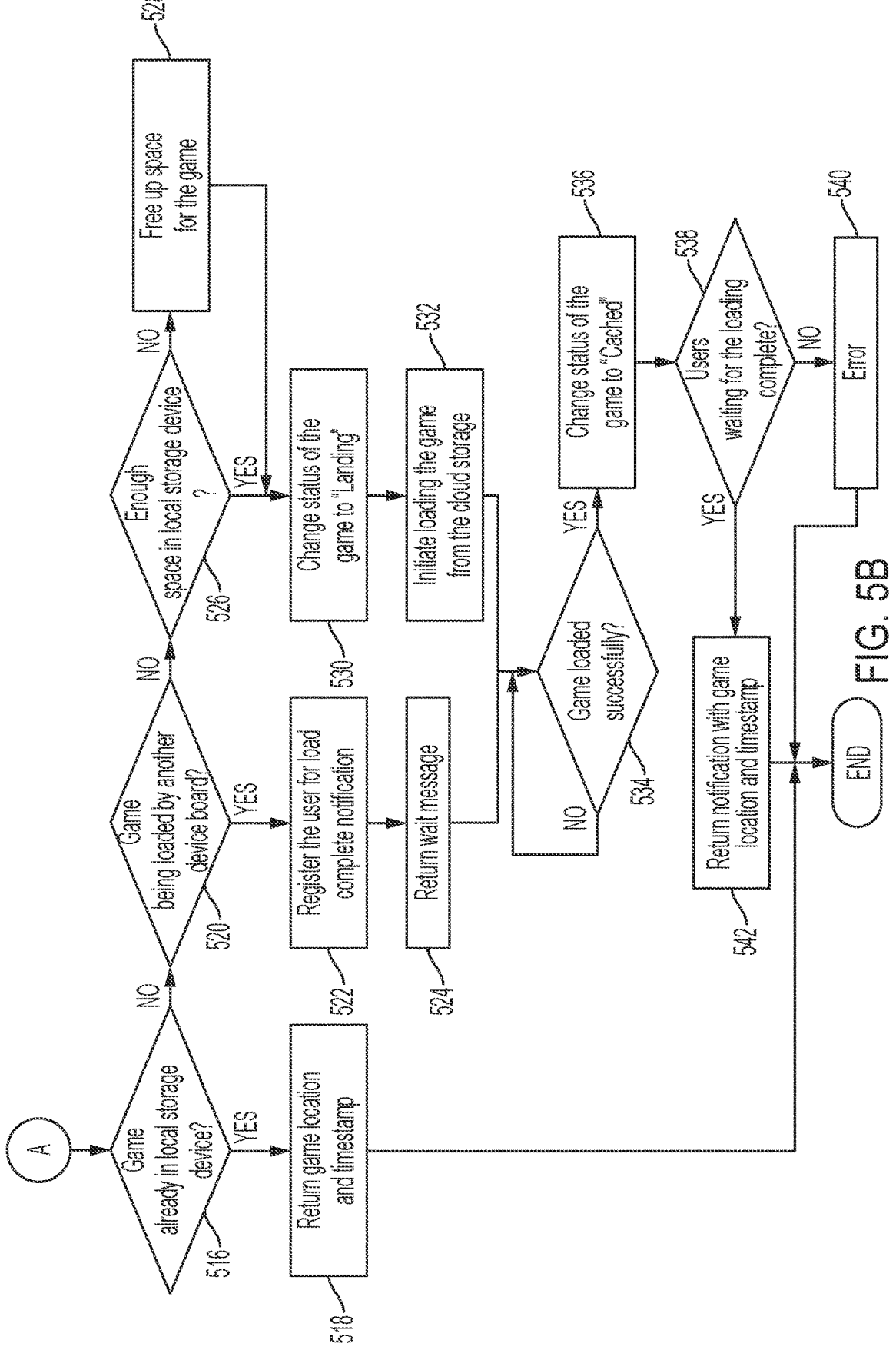
Figure 5C:
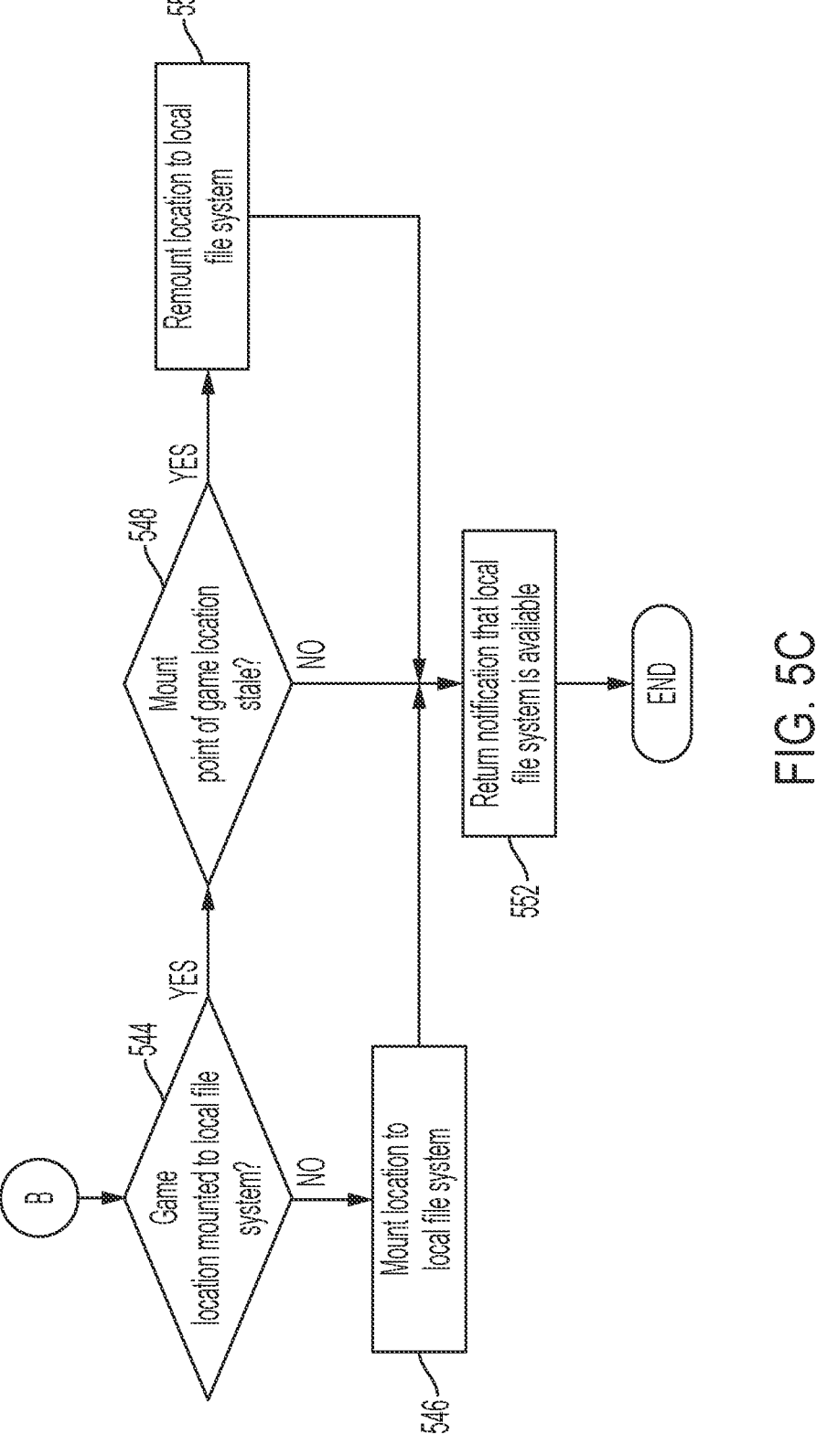

FIGS. 5A-5C are flow diagrams of a method for local disk storage sharing, according to one or more example embodiments of the present disclosure.

However, the present disclosure is not limited to the sequence or number of the operations of the method 500 shown in FIGS. 5A-5C, and can be altered into any desired sequence or number of operations as recognized by a person having ordinary skill in the art. For example, in some embodiments, the order may vary, or the method may include fewer or additional operations. Further, the operations shown in the method 500 may be performed by any suitable one of the components or any suitable combination of the components of those of one or more example embodiments described above.

Referring to FIG. 5A, the method 500 starts, and a selection of a game is received from a user device associated with a device board at block 502. For example, in some embodiments, the user may use a user device (e.g., 104 or 106) to communicate with one of the device boards 210 or 212 to select a game from the catalog of games served by the content provider platform 102. A location of the game is requested at block 504. For example, the device board may request a location of the game to the catalog manager 310, and the method 500 may continue at block 516, which will be described in more detail below with reference to FIG. 5B.

Still referring to FIG. 5A, a determination is made whether a valid location is received at block 506. For example, in some embodiments, the device board may determine whether a valid location is received from the catalog manager 310 at block 506, and if not (e.g., NO at 506), then whether a load complete notification is returned from the catalog manager 310 at block 508. For example, in some embodiments, at block 506, the device board may determine whether the catalog manager 310 returns a game location and timestamp (e.g., see block 518 in FIG. 5B), and at block 508, the device board may determine whether the catalog manager 310 returns a load complete notification with the game location and timestamp (e.g., see block 542 in FIG. 5B). If not (e.g., NO at 508), the device board may continue to wait until the load complete notification is received at block 508.

On the other hand, if the device board receives the location and timestamp (e.g., YES at either 506 or 508), a determination may be made whether the device board's local file system 216 is available at block 510. For example, in some embodiments, the device board may request to the data coordinator 312 to check whether its local file system 216 has the updated game location at block 510, and the method 500 may continue at block 544, which will be described in more detail below with reference to FIG.

Still referring to FIG. 5A, a determination may be made whether the game is available on the local file system at block 512. For example, in some embodiments, the device board may wait for a notification indicating that its local file system 216 has been updated (e.g., see block 552 in FIG. 5C). If the notification has not been received (e.g., NO at block 512), the device board may continue to wait for the local file system 216 to be mounted (e.g., see block 546 in FIG. 5C) or remounted (e.g., see block 550 in FIG. 5C). On the other hand, if the notification is received (e.g., YES at block 512), the device board may load the game into internal memory thereof via its local file system 216 to run (e.g., to execute) the game at block 514, and the method 500 may end.

Referring to FIG. 5B, when the device board requests the location of the game to the catalog manager at block 504, the method 500 may continue as shown in FIG. 5B, such that a determination may be made whether the game is already stored (e.g., already cached) in the local storage device 214 at block 516. For example, in some embodiments, the catalog manager 310 may check the game status in the catalog for the shared namespace 320 to determine whether the game is already loaded in the local storage device 214. If so (e.g., YES at block 516), the catalog manager 310 may return the game location and timestamp at block 518 and the method 500 may continue at block 506 such that the device board requests the local file system availability at block 510.

On the other hand, if the game is not already stored on the local storage device 214 (e.g., NO at block 516), a determination may be made whether the game is being loaded by another device board associated with the local storage device 214 at block 520. For example, the catalog manager 310 may check the game status in the catalog (e.g., the game status is "loading") to determine whether another one of the device boards has already requested loading of the game into the local storage device 214. If so (e.g., YES at block 520), the user may be registered as a waiter for the game in the catalog for load completion notification at block 522, and a wait message may be returned at block 524. In this case, because no valid location has been received at block 506 (e.g., see FIG. 5A), the device board may continue to wait at block 508 for the load complete notification, and the method 500 may continue at operation 534 for the game to be successfully loaded.

If the game is not being loaded by another device board (e.g., NO at operation 520), a determination may be made whether there is enough space in the local storage device 214 for loading the game at operation 526. For example, in some embodiments, the catalog manager 310 (or the data coordinator 312) may determine whether there is an available shared namespace 320 with enough capacity to store the game. If not (e.g., NO at operation 526), space may be freed up for the game. For example, in some embodiments the catalog manager 310 (or the data coordinator 312) may evict a game from a shared namespace 320 to make the shared namespace 320 available for storing the game.

If there is enough space in the local storage device 214 for the game (e.g., YES at block 526), a status of the game in the catalog may be changed to "loading" at block 530, and loading of the game may be initiated at block 532. For example, in some embodiments, the catalog manager 310 may inform the data coordinator 312 to load the game from the cloud storage 204 to the available shared namespace 320. In this case, the data coordinator 312 may read the game from the cloud storage 204 to load the game into the available namespace 320 through a local file system, and may update the available namespace 320 with the partition and the LUN associated with the loaded game.

A determination may be made whether the game is successfully loaded at block 534. For example, in some embodiments, the catalog manager 310 may monitor the game status in the catalog 320 to determine whether the data coordinator 312 has updated the available namespace 320 with the loaded game information (e.g., partition and LUN). If not (e.g., NO at block 534), the catalog manager may continue to wait for the update at block 534. On the other hand, if the game has been successfully loaded (e.g., YES at block 534), the status of the game in the catalog may be changed to "cached" at block 536, and a determination may be made whether any users are waiting for the loading of the game to be complete at operation 538. For example, in some embodiments, the catalog manager 310 may determine whether the user who requested the game to be loaded is still online, and/or whether there are any pending wait messages for users waiting for the game to be loaded.

If not (e.g., NO at block 538), an error state may occur, and the method 500 may end. On the other hand, if there are users waiting for the loading to be complete at operation 538, a notification (e.g., a load complete notification) with the game location and timestamp may be returned at block 542, and the method may continue at operation 510 (e.g., see FIG. 5A). For example, in some embodiments, the catalog manager 310 may send the notification to the device board, and the device board may request local file system availability for the loaded game at block 510.

Referring to FIG. 5C, when the device board requests the local file system availability for the loaded game at block 510, the method 500 may continue as shown in FIG. 5C, such that a determination may be made whether the game location (e.g., namespace, partition, LUN, and/or the like) is mounted to the local file system 216 at block 544. For example, in some embodiments, the data coordinator 312 may communicate with the local file system 216 associated with the device board to determine whether the local file system 216 has the updated namespace information corresponding to the loaded game. In this case, because each of the device boards (e.g., device boards) may have its own local file system 216, and may each load games to the shared local storage device 214 at any time, when an update to the local storage device 214 is made by one of the device boards, the other device board may be unaware of the update as its local file system 216 may have stale namespace information. Accordingly, in some embodiments, the data coordinator 312 may mount or may remount the updated namespace information corresponding to the loaded game to the local file system 216.

For example, in some embodiments, if the game location (e.g., namespace, partition, LUN, and/or the like) is not mounted to the local files system 216 (e.g., NO at block 544), the game location may be mounted to the local file system 546, and a notification may be returned that the local file system is available at operation 552. For example, in some embodiments, the data coordinator 312 may communicate with the catalog manager to determine whether the local file system 216 has the current game location, and if not (e.g., NO at operation 544), the data coordinator 316 may mount the namespace (e.g., partition and LUN) corresponding to the game location to the local file system 216.

On the other hand, if the game location is already mounted on the local file system (e.g., YES at block 544), a determination may be made whether the mount point of the game location is stale. For example, because the shared storage device 214 may be accessed by any of the device boards connected to the ports thereof at any time, the game location may be changed, and the game location mounted on the local file system 216 may include stale game location information.

If the game location mounted on the local file system 216 is not stale (e.g., NO at operation 548), then a notification may be returned that the local file system 216 is available at operation 552, and the method may continue at block 514 (e.g., see FIG. 5A) such that the game is loaded through the local file system 216 into internal memory of the device board (e.g., of a corresponding device board) to run (e.g., to execute) the game. On the other hand, if the mount point is stale (e.g., YES at block 548), the game location may be remounted to the local file system 216, and the notification may be returned such that the method 500 may continue at block 514 (e.g., see FIG. 5A).

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has, " "have, " and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. A content provider system comprising:
a content storage configured to store a catalog of content;
a storage device comprising a first connection;
a first hosted device connected to the first connection over a first storage interface for access to the storage device, and configured to obtain content stored in the storage device to provide the content to a first remote device; and
one or more processing circuits configured to:
receive a request for requested content stored in the content storage from the first hosted device;
load the requested content from the content storage to the storage device to store the requested content in the storage device; and
notify, based on at least the request from the first hosted device, the first hosted device and a second hosted device different from the first hosted device of a location of the requested content loaded to and stored in the storage device,
wherein the request for the requested content corresponds to a first request by the first hosted device and a second request by the second hosted device, and
wherein the requested content is loaded from the content storage to the storage device based on the first request.

2. The system of claim 1, wherein the second hosted device is connected to a second connection of the storage device over a second storage interface for access to the storage device, and configured to obtain content stored in the storage device to provide the content to a second remote device.

3. The system of claim 2, wherein the storage device is physically connected to the first and second hosted devices via the first and second connections.

4. The system of claim 2, wherein the first storage interface corresponds to a first Peripheral Component Interconnect Express (PCIe) lane, and the second storage interface corresponds to a second PCIe lane.

5. The system of claim 1, wherein the one or more processing circuits are configured to enable read access to the storage device by the first and second hosted devices, and control write access to the storage device by the first and second hosted devices.

6. The system of claim 1, wherein the one or more processing circuits are configured to:

register the second request for a notification based on the first request.

7. The system of claim 1, wherein the storage device comprises:
a first namespace associated with the first hosted device, and comprising user data and operating system information corresponding to the first hosted device;
a second namespace associated with the second hosted device, and comprising user data and operating system information corresponding to the second hosted device; and
one or more third namespaces associated with one or more of the content stored in the storage device, and comprising partition information and a logical unit number (LUN) corresponding to the one or more of the content stored in the storage device.

8. The system of claim 7, wherein the one or more processing circuits are configured to:
identify one of the third namespaces for storing the requested content; and
load the requested content from the content storage to the one of the third namespaces.

9. The system of claim 8, wherein the one or more processing circuits are configured to notify the first and second hosted devices by providing a location associated with the one of the third namespaces to a file system of the first device and a file system of the second device.

10. A method comprising:
receiving, by one or more processors, a request for requested content from a first hosted device;
loading, by the one or more processors, the requested content from a content storage to a storage device according to the request to store the requested content in the storage device; and
notifying, by the one or more processors, based on at least the request from the first hosted device, the first hosted device and a second hosted device different from the first hosted device of a location of the requested content loaded to and stored in the storage device,
wherein the request for the requested content corresponds to a first request by the first hosted device and a second request by the second hosted device, and
wherein the requested content is loaded from the content storage to the storage device based on the first request.

11. The method of claim 10, wherein the first hosted device is connected to a first connection of the storage device over a storage interface to obtain content stored in the storage device to provide the content to a first remote device, and
wherein the second hosted device is connected to a second connection of the storage device over the storage interface to obtain the content stored in the storage device to provide the content to a second remote device.

12. The method of claim 11, wherein the storage device is physically connected to the first and second hosted devices via the first and second connections.

13. The method of claim 10, further comprising:
enabling, by the one or more processors, read access to the storage device by the first and second hosted devices; and
controlling, by the one or more processors, write access to the storage device by the first and second hosted devices.

14. The method of claim 10, wherein the method further comprises:

registering, by the one or more processors, the second request for a notification based on the first request.

15. The method of claim 10, wherein the storage device comprises:

a first namespace associated with the first device, and comprising user data and operating system information corresponding to the first hosted device;

a second namespace associated with the second hosted device, and comprising user data and operating system information corresponding to the second hosted device; and one or more third namespaces associated with one or more content stored in the storage device, and comprising partition information and a logical unit number (LUN) corresponding to the one or more content stored in the storage device.

16. The method of claim 15, further comprising:

identifying, by the one or more processors, one of the third namespaces for storing the requested content; and loading, by the one or more processors, the requested content from the content storage to the one of the third namespaces.

17. The method of claim 16, wherein the notifying of the first and second hosted devices comprises providing, by the one or more processors, a location associated with the one of the third namespaces to a file system of the first hosted device and a file system of the second hosted device.

18. A content provider system comprising:

a content storage configured to store a catalog of content;

a storage device comprising a first connection;

a first hosted device connected to the first connection over a first storage interface for access to the storage device, and configured to obtain content stored in the storage device to provide the content to a first remote device; and one or more processing circuits configured to:

receive a request for requested content stored in the content storage from the first hosted device;

load the requested content from the content storage to the storage device; and provide, based on at least the request from the first hosted device, a location of the requested content in the storage device to a file system of the first hosted device and a file system of a second hosted device different from the first hosted device, wherein the request for the requested content corresponds to a first request by the first hosted device and a second request by the second hosted device, and wherein the requested content is loaded from the content storage to the storage device based on the first request.

19. The system of claim 18, wherein the storage device is physically connected to the first and second hosted devices via the first connection and a second connection of the storage device different from the first connection.

20. The system of claim 18, wherein the one or more processing circuits are configured to enable read access to the storage device by the first and second hosted devices, and control write access to the storage device by the first and second hosted devices.

* * * * *